United States Patent [19]

Sweeney

[11] Patent Number: 5,352,340
[45] Date of Patent: * Oct. 4, 1994

[54] APPARATUS AND METHOD FOR CONVERSION OF CELLULOSIC AGRICULTURAL WASTES

[76] Inventor: Charles T. Sweeney, 3223 S. Loop 289, Lubbock, Tex. 79423

[ * ] Notice: The portion of the term of this patent subsequent to Jul. 16, 2008 has been disclaimed.

[21] Appl. No.: 808,223

[22] Filed: Dec. 16, 1991

Related U.S. Application Data

[63] Continuation-in-part of Ser. No. 593,028, Oct. 5, 1990, Pat. No. 5,118,397.

[51] Int. Cl.$^5$ ............................................. A23K 1/00
[52] U.S. Cl. .................................. 204/103; 204/131; 426/615; 426/635; 426/636; 426/807
[58] Field of Search ................ 204/131, 103; 426/615, 426/635, 636, 807

[56] References Cited

U.S. PATENT DOCUMENTS

| | | | |
|---|---|---|---|
| 5,032,239 | 7/1991 | Sweeney | 204/131 |
| 5,118,397 | 6/1992 | Sweeney | 204/131 |

*Primary Examiner*—T. Tung
*Assistant Examiner*—Arun S. Phasge
*Attorney, Agent, or Firm*—Neal J. Mosely

[57] ABSTRACT

A method for conversion of comminuted cellulosic agricultural wastes into a form edible by ruminant animals comprises treating such wastes, e.g., straw, corn stalks and husks, cotton wastes, peanut shells, saw dust, grains (corn, sorghum), etc. by treating with an aqueous solution of a mixed oxidant gas, at a pH of about 7-9, to produce a total water content of less than 20%, a pH of about 7.5-8.3, and NaOH content of less than 5.0% in the waste. The mixed-oxidant gas is produced by a novel electrolytic cell having an anode compartment, cathode compartment and membrane separating the compartments to permit a limited flow of electrolyte therebetween. The anode compartment contains a plurality of anodes and bi-polar electrodes supported in a substantially co-planar relation spaced laterally from each other. The anodes are electrically connected and the bi-polar electrodes are insulated therefrom. An alternate embodiment uses a triple anode comprising a titanium sheet having a coating of the type used on chlorine-producing anodes and flat titanium mesh sheets having a coating of the type used on oxygen-producing anodes on opposite sides thereof supported by insulated spacers. A salt solution electrolyzed in this cell produces the above-mentioned mixed oxidant gas which when absorbed in alkaline solution forms a mixture of oxidant species. The treated product obtained is a satisfactory feed for ruminant animals, being non-toxic and digestible.

16 Claims, 3 Drawing Sheets

APPARATUS AND METHOD FOR CONVERSION OF CELLULOSIC AGRICULTURAL WASTES

CROSS REFERENCE TO RELATED APPLICATION

This application is a continuation-in-part of co-pending application Ser. No. 593,028, filed Oct. 5, 1990 now U.S. Pat. No. 5,118,397.

FIELD OF THE INVENTION

This invention relates to new and useful improvements in methods for conversion of cellulosic wastes into a form which is more edible and digestible by ruminant animals and in electrolytic cells and electrodes for use in such methods.

BRIEF DESCRIPTION OF THE PRIOR ART

Crop residues, i.e., cellulosic wastes, such as cotton gin trash, straw, corn stalks and husks, cotton wastes, peanut shells, saw dust, etc., offer a tremendous feed resource for ruminant animals. For each pound to corn, wheat, milo, etc., produced there is left a cellulosic residue of about one pound. A small amount of these residues are used as animal feed, e.g., by grazing of fields after harvesting the grain.

Cellulosic wastes, such as cotton gin trash, straw, corn stalks and husks, cotton wastes, peanut shells, saw dust, etc., are highly lignified cellulose structures which are digested poorly, if at all, by ruminants. For example, cotton gin trash is only digested about 36%–44% by ruminants as compared to 55–60% for conventional forage such as alfalfa and 80–90% for grains. Some of these ligno-cellulosic wastes, e.g., cotton gin trash, are useful only for their thermal value from burning and have a zero or negative economic value.

It has been known for forty years that the lignin in cellulosic wastes is responsible for the low digestibility. Recently, work at the University of Illinois, University of Nebraska and Texas Tech University has shown that the lignin in cellulosic wastes can be broken down by treatment with alka line hydrogen peroxide to produce a cellulosic residue which is 55–75% digestible. The problem in utilization of this treatment has been one of logistics as well as the additional expense of the hydrogen peroxide in the quantities required.

The cellulosic wastes derived from agricultural practices are readily available on the farm, or at cotton gins in the case of gin trash, but these materials are bulky and expensive to transport. It is therefore uneconomical to move the dispersed cellulosic wastes to chemical processing facilities. The only practical way, at present, to treat these wastes would involve treatment and consumption of the treated materials on the farm. Central processing might be practical, however, in the case of cotton gin trash, because of the large quantities collected at central locations. The economics of the alkaline hydrogen peroxide treatment is another matter. Even in the quantities used, hydrogen peroxide is expensive and the cost of treatment makes the entire process of treatment economically doubtful. The development of a cheap process for manufacture of hydrogen peroxide at the point of use on the farm might overcome these economic constraints.

The following references are relevant to the production of oxidizers and their use in chemically treating agricultural wastes. R. Norris Shreve, "Chemical Process Industries" 3rd Ed., McGraw-Hill, New York, N.Y. pp. 222–259, (1967); "Kirk Othmer, Encyclopedia of Chemical Technology" 3rd Ed. vol X5, 580–611, Interscience Publishers, New York, N. Y. (1968); Wendell Latymer, "Oxidation Potentials" Prentice Hall, New York, N.Y. (1952); Michael Andon "Oxygen" W. A. Benjamin, New York, N.Y. (1965); C. R. Wilke, et. al., "Enzymatic Hydrolysis of Cellulose, Theory and Application" pp. 41–61, Noyes Data Corporation Park Ridge, N.J. (1983); and David A Tillman and Edwin C. John "Progress in Biomass Conversion" Volume 4, Academic Press, New York, N.Y. (1983).

Charles T. Sweeney, U.S. patent application Ser. No. 328,278, filed Mar. 24, 1989, now U.S. Pat. No. 5,032,239, and U.S. patent application Ser. No. 593,028, filed Oct. 5, 1990, discloses the use of various mixed oxidant gases in the conversion of cellulosic wastes which offers the prospect of overcoming both the reagent cost and logistical problems encountered in the preparation of ruminant feeds. This research has involved the utilization of various mixed oxidant gases produced by various electrolytic cells.

Chlorine generators based on the use of electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by Dupont for use in electrolytic cells. Anion exchange membranes, of polymers having anion functionality, are made by Ionics Inc. of Watertown, Mass.

Dotson U.S. Pat. No. 3,793,163 discloses the use of Dupont perfluorosulfonic acid (NAFION) membranes in electrolytic cells and makes reference to U.S. Pat. Nos. 2,636,851; 3,017,338; 3,560,568; 3,496,077; 2,967,807; 3,282,875 and British Patent 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085, Westerlund U.S. Pat. No. 4,069,128 and Sweeney U.S. Pat. No. 4,804,449.

Discussion of perfluorosulfonic acid (NAFION) membranes is also discussed in the technical literature, e.g., Dupont Magazine, May–June 1973, pages 22–25 and a paper entitled "Perfluorinated Ion Exchange Membrane" by Grot, Munn and Walmsley, presented to the 141st National Meeting of the Electro-Chemical Society, Houston, Texas, May 7–11, 1972.

The structure of electrodes used in electrolytic cells is set forth in most of the patents listed above. Additionally, the following U.S. Patents disclose configurations of anodes or cathodes used in electrolytic cells.

Giacopelli U.S. Pat. No. 3,375,184 discloses an electrolytic cell with controllable multiple electrodes which are flat plates of wedge-shaped configuration. Ettel U.S. Pat. No. 3,821,097 uses flat plates in electroplating cells. Lohrberg U.S. Pat. No. 3,951,767 discloses the use of flat plate electrolytic anodes having grooves along the bottoms thereof for conducting gas bubbles generated in the electrolytic process. Andreoli U.S. Pat. No. 565,953 discloses electroplating apparatus having a plurality of metal screens which are not connected in the electric circuit and function to plate out the metal being separated by the electrolysis.

In "The chlorine dioxide content of chlorine obtained by electrolysis of salt", Electrochemical Technology 5, 56–58 (1967) Western and Hoogland report that chlorine dioxide is not produced in the electrolysis of salt in the absence of chlorates.

Sweeney U.S. Pat. No. 4,256,552 discloses an electrolytic generator for production of chlorine, for chlorination of swimming pools, water systems, etc., in which a bi-polar electrode is positioned in the anode compartment between the anode and the cation-exchange membrane in the wall separating the compartments. Sweeney U.S. Pat. No. 4,334,968 discloses improvements on the cell or generator of U.S. Pat. No. 4,256,552 and discloses the production of chlorine dioxide in the cell. Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions. Sweeney U.S. Pat. No. 4,308,117 discloses a cell having three compartments, with the anode and cathode in the outer compartments and the bi-polar electrode in the central compartment. A cation-exchange membrane is positioned in the wall between the central compartment and cathode compartment, while an anion-exchange membrane is positioned in the wall between the central compartment and the anode compartment. Sweeney U.S. Pat. No. 4,324,635 discloses a cell having an anode compartment, a cathode compartment, and a separating wall with a cathode-exchange membrane therein. The cell includes a pump circulating some of the cathode compartment solution to the anode compartment for pH control. The gases produced by these cells have come to be referred to as mixed oxidant gases which contain chlorine, oxides of chlorine, oxygen as ozone, peroxides, and other oxygen species.

In subsequent studies, it has been found that cells of the type shown in U.S. Pat. Nos. 4,256,552, 4,334,968 and 4,248,681 can be operated with very low salt concentrations and, under such conditions, produce oxidizing gases containing very small amounts of chlorine or chlorine compounds. Sweeney U.S. Pat. No. 4,804,449 discloses the use of nonionic membranes of Kanecaron in place of Nafion in electrolytic cells for production of mixed oxidant gases. Kanecaron fibers are of a modacrylic composition of acrylic polymeric structure having 35–85% wt. acrylonitrile units. Kanecaron fibers used in these cells are modacrylic fibers of this general type composed of 50% acrylonitrile and 50% vinyl chloride fibers.

SUMMARY OF THE INVENTION

One object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals utilizing a solution of mixed oxidants produced by a membrane-type electrolytic cell having an anode, a cathode, and a bi-polar electrode supported on the anode and co-planar therewith.

Another object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals utilizing a solution of mixed oxidants produced by a membrane-type electrolytic cell having an anode, a cathode, and two bi-polar electrodes supported on opposite sides of and spaced from the anode.

Another object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals utilizing a solution of mixed oxidants produced by a membrane-type electrolytic cell having a titanium anode, a titanium cathode, and a titanium bi-polar electrode supported on the anode and co-planar therewith.

Another object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals utilizing a solution of mixed oxidants produced by a membrane-type electrolytic cell having a titanium anode, a titanium cathode, and two bi-polar titanium-mesh electrodes supported on opposite sides of and spaced from the anode.

A further object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals utilizing a solution of mixed oxidants comprising chloride and oxygen species at a normality of about 0.0001–0.05 and pH of about 7.5–8.3 produced by a membrane-type electrolytic cell having an anode, a cathode, and a bipolar electrode supported on the anode and co-planar therewith.

A further object of this invention is to provide a new and improved method for the solution treatment of ligno-cellulosic wastes, e.g., cotton gin trash, straw, corn stalks and husks, cotton wastes, peanut shells, saw dust, etc., to convert them to a form significantly more edible and digestible by ruminant animals utilizing a solution of mixed oxidants comprising chloride and oxygen species at a normality of about 0.0001–0.05 and pH of about 7.5–8.3 produced by a membrane-type electrolytic cell having an anode, a cathode, and two bi-polar electrodes supported on opposite sides of and spaced from the anode.

A further object of this invention is to provide a new and improved membrane-type electrolytic cell having an anode, a cathode, and a bi-polar electrode supported on the anode and co-planar therewith operable to produce mixed oxidants which when dissolved in alkaline solution may be used for treatment of ligno-cellulosic wastes, e.g., cotton gin trash, straw, corn stalks and husks, cotton wastes, peanut shells, saw dust, etc., to convert them to a form significantly more edible and digestible by ruminant animals.

A further object of this invention is to provide a new and improved a membrane-type electrolytic cell having an anode, a cathode, and two bi-polar electrodes supported on opposite sides of and spaced from the anode operable to produce mixed oxidants which when dissolved in alkaline solution may be used for treatment of ligno-cellulosic wastes, e.g., cotton gin trash, straw, corn stalks and husks, cotton wastes, peanut shells, saw dust, etc., to convert them to a form significantly more edible and digestible by ruminant animals.

A further object of this invention is to provide a new and improved membrane-type electrolytic cell having a titanium anode, a titanium cathode, and a titanium bi-polar electrode supported on the anode and co-planar therewith, operable to produce mixed oxidants which when dissolved in alkaline solution may be used for treatment of ligno-cellulosic wastes, e.g., cotton gin trash, straw, corn stalks and husks, cotton wastes, peanut shells, saw dust, etc., to convert them to a form significantly more edible and digestible by ruminant animals.

A further object of this invention is to provide a new and improved a membrane-type electrolytic cell having a titanium anode, a steel cathode, and two bi-polar titanium-mesh electrodes supported on opposite sides of and spaced from the anode operable to produce mixed oxidants which when dissolved in alkaline solution may be used for treatment of ligno-cellulosic wastes, e.g., cotton gin trash, straw, corn stalks and husks, cotton wastes, peanut shells, saw dust, etc., to convert them to a form significantly more edible and digestible by ruminant animals.

A still further object of this invention is to provide a new and improved electrode for a membrane-type electrolytic cell comprising a titanium anode and a titanium bi-polar electrode supported on the anode and co-planar therewith.

A still further object of this invention is to provide a new and improved electrode for a membrane-type electrolytic cell comprising a titanium anode and two bi-polar titanium-mesh electrodes supported on opposite sides of and spaced from the anode.

A still further object of this invention is to provide a new and improved solution of mixed oxidants comprising chloride and oxygen species at a normality of about 0.0001–0.05 and pH of about 7.5–8.3.

Other objects will be apparent from time to time throughout the specification and claims as hereinafter related.

These objects and other objects of the invention are accomplished by a novel method for conversion of comminuted cellulosic agricultural wastes into a form edible by ruminant animals which comprises treating such wastes, e.g., straw, corn stalks and husks, cotton wastes, peanut shells, saw dust, (grains such as corn and sorghum ) etc. by treating with an aqueous solution of a mixed oxidant gas, at a pH of about 7–9, to produce a total water content of less than 20%, a pH of about 7.5–8.3, and NaOH content of less than 5.0% in the waste. The mixed-oxidant gas is produced by a novel electrolytic cell having an anode compartment, cathode compartment and membrane separating the compartments to permit a limited flow of electrolyte therebetween. The anode compartment contains a plurality of anodes and bi-polar electrodes supported in a substantially co-planar relation spaced laterally from each other. The anodes are electrically connected and the bi-polar electrodes are insulated therefrom. An alternate embodiment uses a triple anode comprising a titanium sheet having a coating of the type used on chlorine-producing anodes and flat titanium mesh sheets having a coating of the type used on oxygen-producing anodes on opposite sides thereof supported by insulated spacers. A salt solution electrolyzed in this cell produces the above-mentioned mixed oxidant gas which when absorbed in alkaline solution forms a mixture of oxidant species. After a reaction time from a few minutes up to several days, the treated product obtained is washed with water to yield a satisfactory feed for ruminant animals, being non-toxic and digestible.

DESCRIPTION OF PREFERRED EMBODIMENTS OF THIS PROCESS PRIOR ART COMPARISON

In a prior art method (the method of Charles T. Sweeney, U.S. patent application Ser. No. 328,278, filed Mar. 24, 1989, now U.S. Pat. No. 5,032,239, and U.S. patent application Ser. No. 593,028, filed Oct. 5, 1990) for conversion of comminuted ligno-cellulosic agricultural wastes into a form edible by ruminant animals the wastes, e.g., straw, corn stalks and husks, cotton wastes, peanut shells, saw dust, etc. are sprayed with an aqueous solution of a mixed oxidant gas containing chlorine and various oxygen-containing species, at a pH of about 11–12, to produce a total water content of less than 20%, a pH of about 11.4–11.7, and NaOH content of less than 5% in the waste.

Figure 1:
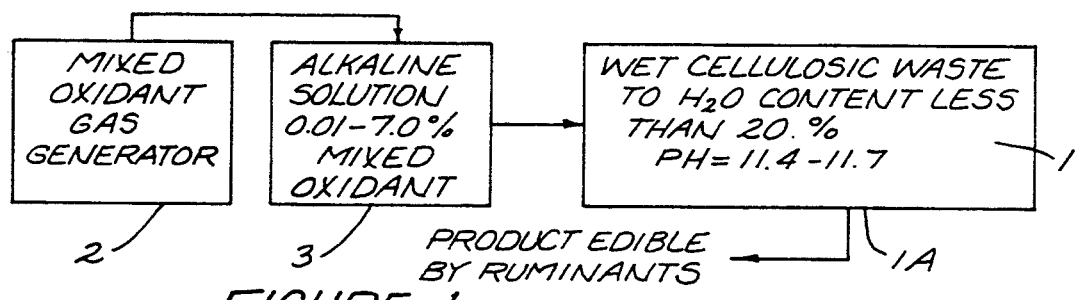
FIG. 1 is a schematic view of a method or system for treatment of cellulosic wastes by treatment with a mixed oxidant solution to produce a product edible by ruminants.

A schematic view of this method or system is shown in FIG. 1 of the drawings wherein a supply of ligno-cellulosic wastes 1, e.g., straw, corn stalks and husks, cotton wastes, peanut shells, saw dust, etc., is comminuted to a relatively small size and introduced into storage zone 1a. A mixed oxidant generator 2, i.e., electrolytic cell, ( Charles T. Sweeney, U.S. patent application Ser. No. 328,278, filed Mar. 24, 1989, now U.S. Pat. No. 5,032,239, and U.S. patent application Set. No. 593,028, filed Oct. 5, 1990) produces an oxidant gas mixture which is introduced into an absorber 3 where it is dissolved in water with appropriate adjustment of pH to an alkaline condition to produce a mixed oxidant solution of 0.01–7.0% as a pH of 7.5–12.0 consisting of a mixture of salts of the formula $NaClO_x$, where x is 1–7.

Figure 2:
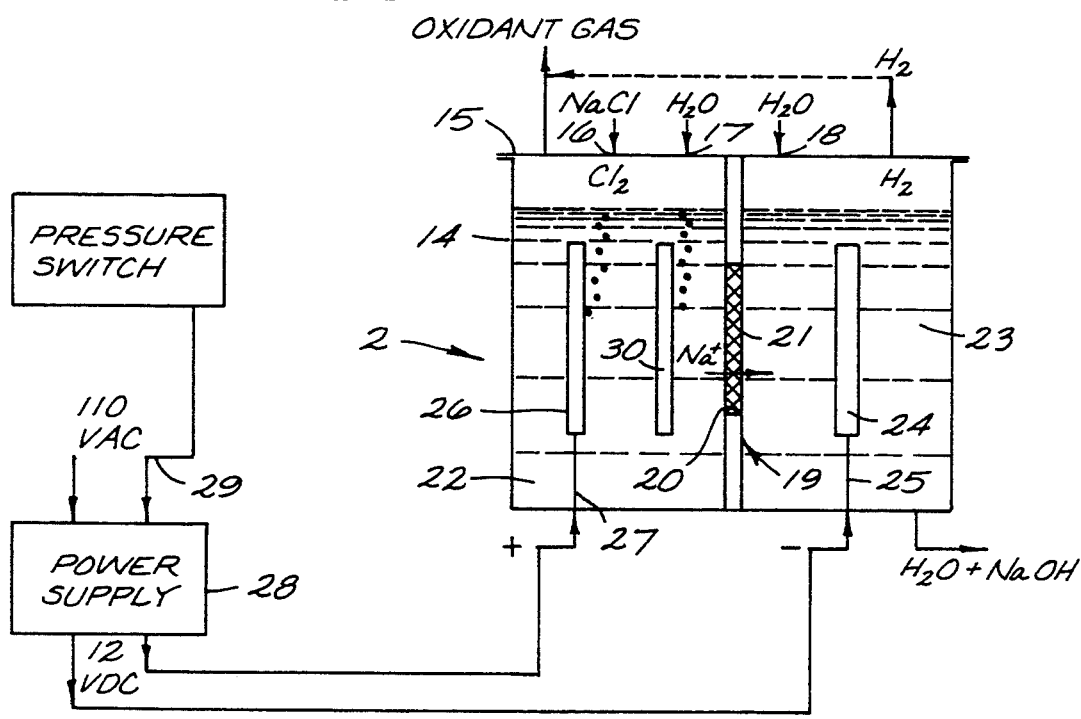
FIG. 2 is a schematic view, in elevation, of a preferred embodiment of an electrolytic generator, of the type shown in U.S. Pat. No. 4,248,681, which has been used in the method or system shown in FIG. 1.
Figure 3:
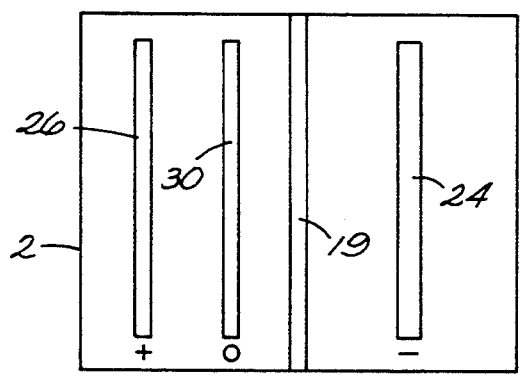
FIG. 3 is a plan view of the electrolytic generator shown in FIG. 2.

The mixed-oxidant gas is a mixture of chlorine, oxides of chlorine, and various oxygen species, such as oxygen, hydrogen peroxide, ozone, etc., preferably produced by a gas generator 2 comprising an electrolytic cell having an anode compartment, bi-polar electrodes in the anode compartment, a cathode compartment and a membrane separating the compartments to permit only a limited flow of electrolyte therebetween. When a low salt concentration solution is electrolyzed in this cell, the output is a mixed oxidant gas containing chlorine and various oxygen-containing species. The gas generator is preferably that shown in U.S. Pat. No. 4,248,681 where the oxidant gas produced from dilute salt solutions contains chlorine, and various oxygen-containing gases. A specific embodiment of the mixed-oxidant gas generator cell 2 is shown in FIGS. 2-3, below.

The solution from absorber 3 is mixed with concentrated aqueous NaOH and the mixture may be diluted with water to the desired alkalinity and is sprayed on the comminuted cellulosic wastes in storage bin or zone 1a to produce a total water content of less than 20%, and pH of 11.4–11.7, NaOH content less than 5%, on the wastes. After a short storage time, the lignocellulosic wastes are converted to a delignified condition with an appreciable conversion of hollo-cellulose to sugars. The product now is digestible to an extent in excess of 50% by ruminant animals.

MIXED OXIDANT GAS GENERATORS

This invention comprises a method for the treatment of cellulosic wastes using a new and improved gas generator and is compared to the gas generator using the mixed oxidant gases produced by the apparatus of Sweeney U.S. Pat. No. 4,248,681. It is therefore deemed appropriate to repeat the description of the Sweeney apparatus and operating procedure to provide a setting for the present invention.

In FIG. 2, electrolytic generator 2 consists of hollow container 14 having a removable cover 15 sealed in place having an opening 16 for introduction of a chloride salt (sodium chloride), and openings 17 and 18 for introduction of water. Hollow container 14 is divided by a vertically extending wall 19 which has a window opening 20 in which there is positioned ion-permeable membrane 21 which conducts cations, e.g. sodium ions, preferably of the type conventionally used in electrolytic cells provided with membrane separation of the anode and the cathode compartments. The preferred membranes are fluorinated polymers, e.g. perfluorosulfonic acid polymers, such as NAFION Registered Trademark, manufactured by Dupont or a nonionic KANECARON fiber membrane.

Wall member 19 including membrane 21 divides the interior of container 14 into an anode compartment 22 and a cathode compartment 23. A cathode 24 is positioned in cathode compartment 23 and connected by electric lead 25 to a point external to container 14. Anode 26 is positioned in anode compartment 22 and is connected by electric lead 27 to a point external to container 14. The apparatus has a power supply, such as a transformer 28 powered by 110 volt power source 29 and providing a 6/12 volt D.C. output connected to electric leads 25 and 27. An electrically bi-polar electrode 30 is positioned in anode compartment 22.

The bi-polar electrode is positioned in the anode compartment between anode 26 and membrane 21. The bi-polar electrodes 30 are positioned in a direct line between anode 26 and cathode 24 and adjacent to ion-permeable membrane 21. Electrode 30 is electrically neutral (bi-polar) in the sense that it is not connected by lead wire to the electric circuit energizing the anode 26 and cathode 24 to effect electrolytic decomposition of a salt solution.

In FIG. 3, the plate-like construction of the various electrodes 24, 26, and 30 is seen. It has been found experimentally that better yields are obtained by increasing the effective area of the anode. Thus, flat-plate electrodes are preferred in the oxidant gas generator of this invention, although in some applications, the cylindrical electrodes or other shapes may be used. The cathode 24 is preferably a flat plate of steel or the like. The anode 26 and the electrically bi-polar electrode 30 are preferably flat plates of carbon.

OPERATION

The electrolytic generator 2 described and shown in FIGS. 2 and 3 has been tested and found to be a substantial improvement over more conventional electrolytic chlorine generators and under certain conditions produce novel oxidant gas compositions.

In the electrolytic generator shown, the cell 14 is charged with water in both the anode compartment 22 and the cathode compartment 23 to a level above the top of the various electrodes but leaving a sufficient space at the top for the collection of gases. Common table salt (sodium chloride) was added to the water in the anode compartment. In carrying out this process, any soluble chloride salt may be used, e.g. sodium chloride, potassium chloride, lithium chloride, rubidium chloride, cesium chloride, ammonium chloride, magnesium chloride, etc., although for economic reasons sodium chloride is preferred. The ion-permeable membrane 21 in the cell is Dupont NAFION or nonionic KANECARON membrane. Neutral (bi-polar) electrode 30 was placed approximately one inch from the membrane. 12 volt D.C. were applied an monitored by a D.C. ammeter in the circuit.

The system was turned on. There was immediate, visible generation of hydrogen at the cathode. There is a substantial lag in the production of gases in the anode compartment. After a short period of time, however, gas begins to form at both the anode 26 and the neutral (bipolar) electrode 30. The gas produced at the anode 26 and the neutral (bipolar) electrode 30 is a mixture of chlorine and chlorine dioxide when a high concentration of salt is used. The proportions of operation and in some cases the chlorine dioxide is present in a substantial excess over the chlorine.

In the start up of a chlorine generator, there is usually a substantial induction, or lag time which results from the low conductivity in the cathode compartment. Usually, the operation of the cell is relatively slow until sufficient sodium ions have been converted into sodium hydroxide at the cathode 24 and the caustic solution has reached a sufficient level of concentration to be highly electrically conductive. Likewise, in the anode compartment, there is usually an induction, or lag time resulting from the solubility of chlorine in water, particularly when the chlorine is generated slowly.

In this electrolytic generator there is a more rapid build up of sodium hydroxide in the cathode compartment as a result of the short distance that the sodium ions must travel from the bi-polar electrode 30 to pass through ion-permeable membrane 21. Also, the generation of the gas mixture at anode 26 and bi-polar electrode 30 is so vigorous that there is an almost immediate generation of gas from the cell.

The productivity of this cell was initially evaluated using the DPD colorimetric method of measuring residual chlorine in water. There was no long loss of time for start up and waiting for solutions to be concentrated with salt or caustic levels to rise. In conventional electrolytic chlorine generators the lag time in start up has often been days.

By placing bi-polar electrode 30 in the cell 14 and locating the electrode in line between cathode 24 and anode 26 adjacent to ion-permeable membrane 21, substantial advantages are obtained. Bi-polar electrode 30 acts as an anode relative to cathode 24 and also acts as a cathode relative to anode 26. In this manner, bi-polar electrode 30 assists in effecting a rapid transfer of sodium ions to cathode compartment 23 and improves the rate of build up of caustic in that compartment. It also functions to improve the chlorine/chlorine dioxide output and to reduce the induction period or start up time for the cell.

When the cell 14 is operated with relatively low salt concentrations, sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased. The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and have been effective in the digestion of cellulosic wastes.

CHARACTERIZATION OF ALKALINE MIXED OXIDES SOLUTIONS

Figure 4:
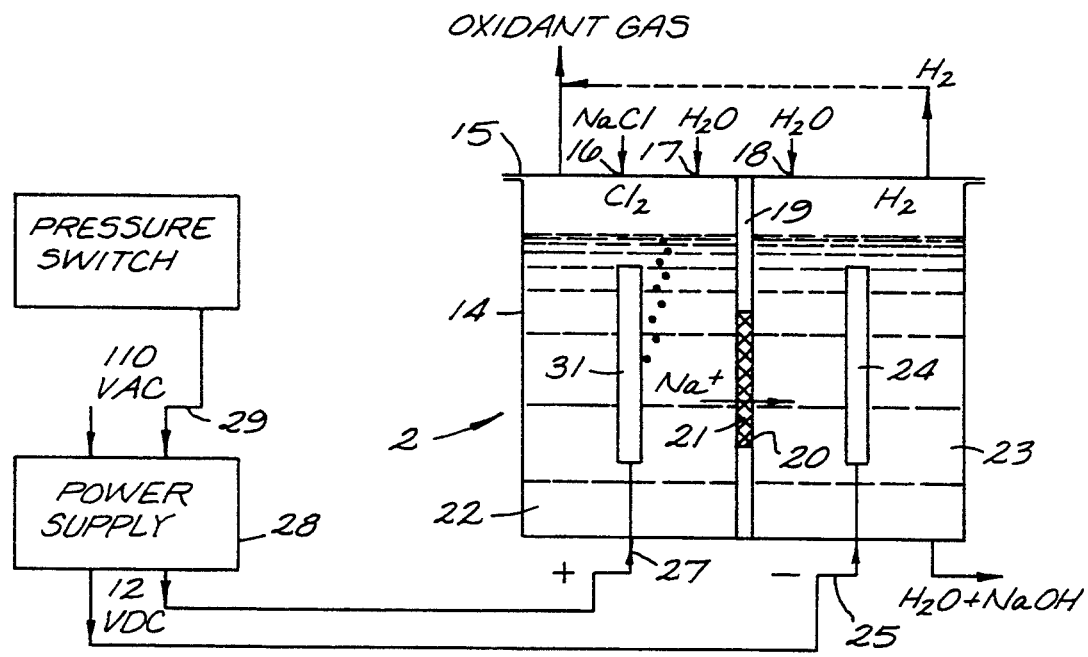
FIG. 4 is a plan view of another embodiment of electrolytic generator, for use in the method or system shown in FIG. 1, having no separate bi-polar electrodes between the anode and compartment-separating membrane.
Figures 5, 6:
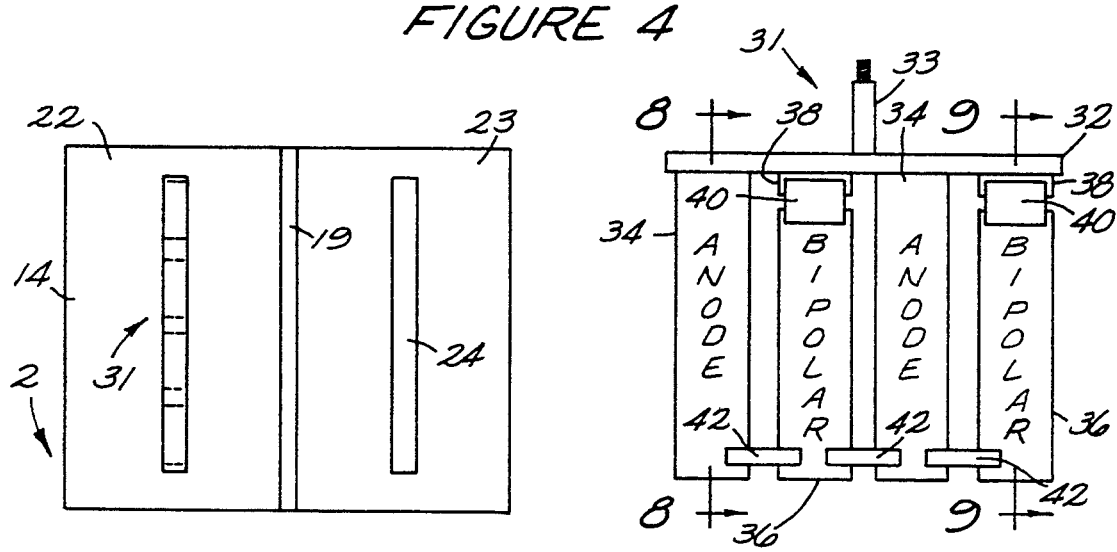
FIG. 5 is a plan view of the embodiment of electrolytic generator shown in FIG. 4.
FIG. 6 is a plan view of the anode/bi-polar electrode used in the electrolytic generator of FIGS. 4 and 5.

The apparatus of FIG. 4 was used in the generation of mixed oxide gases and in the preparation of alkaline solutions used in the subsequent treatment of ligno-cellulosic wastes. As described above, the electrolytic unit used has a proprietary diaphragm for separation of the anode and cathode chambers and multiple, bi-polar configurations of the electrodes to enhance the electrochemical reactions. Gaseous components generated within the anode cheer are withdrawn as a gaseous mixture of air and entrained in a caustic solution. Entrainment is accomplished by recirculating the caustic solution through an aspirator which exerts a slight negative pressure on the anode chamber. The reagents produced by the electrolytic process in the anode chamber are predominantly chlorooxy acids in aqueous solutions. Hence their vapor phase constituents, which are swept from the anode chamber, are neutralized by contact with the caustic solution at the aspirator and become stabilized as dissolved salts. NaOH is produced in the cathode chamber and may be used at any point in the system where alkali is needed and eliminates the need to use alkali obtained commercially.

While neutralization and stabilization greatly reduce the oxidizing potential of many of the oxidizing species generated in the anode chamber, it enhances the activity of others. A number of experiments were undertaken to identify the active species. The experimental evidence suggests that the major active ingredients are sodium salts of $ClO_x$. While $x=1$ predominates, others values of x up to six and seven are possible. Other active ingredients appears to be salts of the Oxion. These latter compounds are not nearly as stable in caustic solutions as are the $ClO_x$ salts, and they certainly are more difficult to monitor on an analytical basis. In both cases, however, the salt complexes can be destabilized by acid conditions (pH reduction) and ultraviolet light.

There is one final indication that $ClO_x$ salts are the major ingredient of the liquid reagent. This indicator was drawn from the observation that the ash content of treated cotton gin wastes increased over and above that of the untreated materials. The increase went beyond what might be expected from the addition of the NaOH (0.4%) to the base reagent. Only the presence of the stable, salt forming chloride ion accounts for this increasing level of ash. The $O_x$ salts are not stable enough to withstand the thermal effects of the ashing process. Hence the preponderance of the experimental evidence suggests that for the liquid reagent generated for use in the feed trials, the active ingredients are sodium salts of $ClO_x$.

PREFERRED EMBODIMENTS OF THE APPARATUS

In FIGS. 4 to 11 there are shown two preferred embodiments of the oxidant gas generator shown which comprise this invention. In these views, the oxidant gas generator is shown in plan view as in FIG. 3 and is shows different arrangements of bi-polar electrodes and/or different configurations of electrodes.

CO-PLANAR ANODE/BI-POLAR ELECTRODE ASSEMBLY

In FIG. 4, electrolytic generator 2 consists of hollow container 14 having a removable cover 15 sealed in place having an opening 16 for introduction of a chloride salt (sodium chloride), and openings 17 and 18 for introduction of water. Hollow container 14 is divided by a vertically extending wall 19 which has a window opening 20 in which there is positioned ion-permeable membrane 21 which conducts cations, e.g. sodium ions, preferably of the type conventionally used in electrolytic cells provided with membrane separation of the anode and the cathode compartments. The preferred membranes are fluorinated polymers, e.g. perfluorosulfonic acid polymers, such as NAFION Registered Trademark, manufactured by Dupont or a nonionic KANECARON fiber membrane.

Wall member 19 including membrane 21 divides the interior of container 14 into anode compartment 22 and cathode compartment 23. A steel plate cathode 24 is positioned in cathode compartment 23 and connected by electric lead 25 outside container 14. Anode assembly 31 is positioned in anode compartment 22 and is connected by electric lead 27 outside container 14. The apparatus has a power supply, such as a transformer 28 powered by 110 volt power source 29 providing a 6/12 volt D.C., 0–500 amp. output connected to electric leads 25 and 27.

Anode assembly 31 (FIGS. 6–7) comprises titanium-coated copper bus rod 32 with a threaded titanium-coated copper connector rod 33 welded or brazed thereon. A pair of rectangular plate anodes 34 are welded or brazed to bus rod 32 in laterally spaced relation thereon. Anode plates 34 (FIGS. 6 –8) are of electrode grade titanium metal having a proprietary coating 35 of the type used in electrodes for chlorine production. Anode plates 34 are manufactured by Eltech and sold for use in chlorine-producing cells.

Anode assembly 31 also includes a pair of rectangular bi-polar plate members 36 which are supported on stub plates 38 by insulated spacers 40. Stub plates 38 are welded or brazed to bus rod 32. Stub plates 38 and bi-polar plate members 36 are made of electrode-grade titanium having a coating 39 of the type used in electrodes for oxygen production. The coated titanium plates 36 and 38 (FIG. 9) are manufactured by Eltech and sold for use in oxygen-producing cells.

Anode assembly 31 has anode plates 34 and bi-polar plates 36 and stub supports 38 in co-planar relation on bus rod 32. Insulated spacers 40 insulate bi-polar plates 36 from stub supports 38 and insulated spacers 42 insulate anode plates 34 from each other. The anode plates 34 and bi-polar plates 36 and stub supports 38 are of the same thickness and the bi-polar plates 36 and stub supports 38 total about the same area as anode plates 34.

THREE-PART ANODE ASSEMBLY

Figures 7, 8, 9:
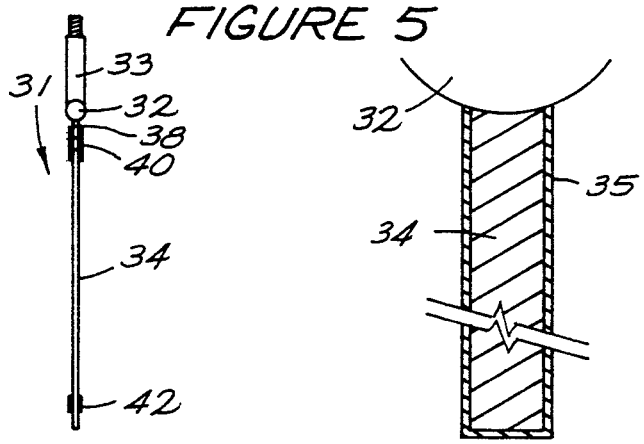
FIG. 7 is a view in side elevation of the anode/bipolar electrode shown in FIG. 6.
FIG. 8 is a sectional view taken on the line 8—8 of FIG. 6.
FIG. 9 is a sectional view taken on the line 9—9 of FIG. 6.
Figures 10, 11:
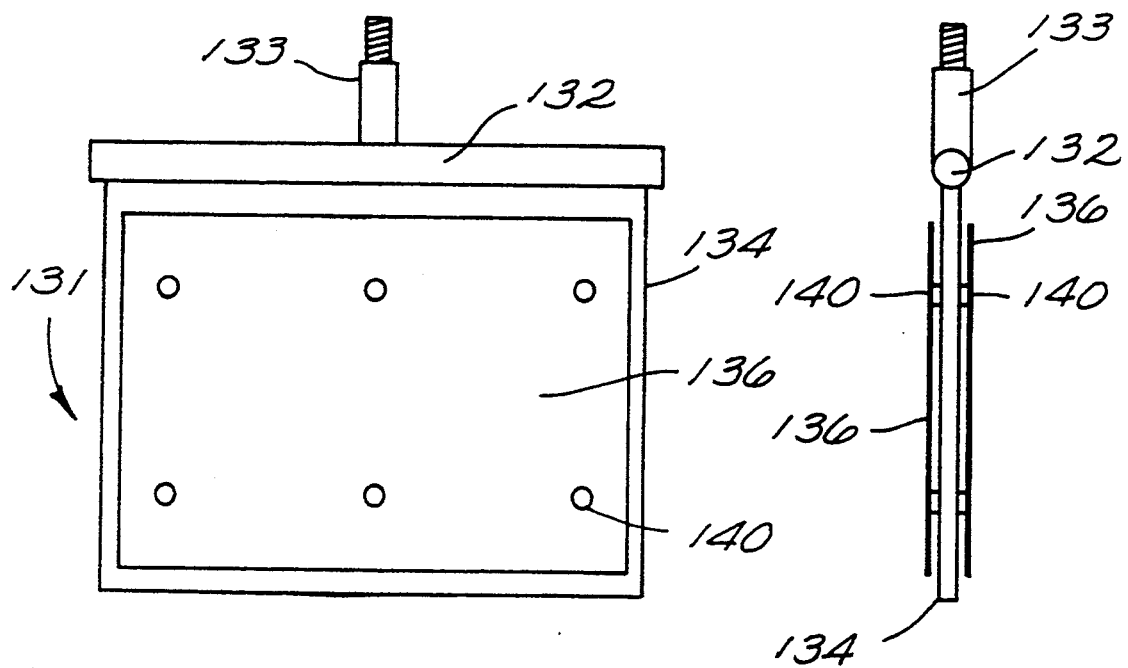
FIG. 10 is a plan view of another anode/bi-polar electrode element to be used in the in the electrolytic generator of FIGS. 4 and 5.
FIG. 11 is a view in side elevation of the anode/bipolar electrode element shown in FIG. 10.

In FIGS. 9 and 10, there is shown a three-part anode assembly which is substituted for the anode/bi-polar electrode assembly 31 in the embodiment of FIGS. 4–9. The description of the cell is repeated below to the extent necessary to describe the assembly and function of the three-part anode assembly.

In FIG. 4, electrolytic generator 2 consists of hollow container 14 having a removable cover 15 sealed in place having an opening 16 for introduction of a chloride salt (sodium chloride), and openings 17 and 18 for introduction of water. Hollow container 14 is divided by a vertically extending wall 19 which has a window opening 20 in which there is positioned ion-permeable membrane 21 which conducts cations, e.g. sodium ions, preferably of the type conventionally used in electrolytic cells provided with membrane separation of the anode and the cathode compartments. The preferred membranes are fluorinated polymers, e.g. perfluorosulfonic acid polymers, such as NAFION Registered Trademark, manufactured by Dupont or a nonionic KANECARON fiber membrane.

Wall member 19 including membrane 21 divides the interior of container 14 into anode compartment 22 and cathode compartment 23. A steel plate cathode 24 is positioned in cathode compartment 23 and connected by electric lead 25 outside container 14. Anode assembly 131 is substituted for anode assembly 31 and positioned in anode compartment 22 and connected by electric lead 27 outside container 14. The apparatus has a power supply, such as a transformer 28 powered by 110 volt power source 29 and providing a 6/12 volt D.C., 0–500 amp. output connected to electric leads 25 and 27.

Three-part anode assembly 131 (FIGS. 10–11) comprises titanium-coated copper bus rod 132 with a threaded titanium-coated copper connector rod 133 welded or brazed thereon. A rectangular plate anode 134 is welded or brazed to bus rod 132. Anode plate 134 (FIGS. 10–11) is of electrode grade titanium metal having a proprietary coating of the type used in electrodes for chlorine production. Anode plate material for anode 134 is manufactured by Eltech and sold for use in chlorine-producing cells.

Anode assembly 131 also includes a pair of rectangular bi-polar plate-shaped coated titanium mesh members 136 which are supported on opposite sides of anode plate 134 by insulated spacers 140. The coated titanium mesh members 136 (FIGS. 10 and 11) have the filaments forming the mesh coated with a material of the type used in electrodes for oxygen production. The coated titanium mesh members 136 are manufactured by Eltech and sold for use in oxygen-producing cells. The titanium mesh is a thin sheet of titanium with diamond shaped holes (about $\frac{1}{4}''$ on a side) closely spaced in rows to leave a sheet mesh. The sheet mesh is coated after formation of the holes therein.

CHARACTERIZATION OF ALKALINE MIXED OXIDES SOLUTIONS

The apparatus of FIGS. 4–11 was used in the generation of mixed oxide gases and in the preparation of alkaline solutions used in the subsequent treatment of ligno-cellulosic wastes. As described above, the electrolytic unit used has a proprietary diaphragm for separation of the anode and cathode chambers and multiple, bi-polar configurations of the electrodes to enhance the electrochemical reactions. NaOH is produced in the cathode chamber and may be used at any point in the system where alkali is needed and eliminates the need to use alkali obtained commercially. Gaseous components generated within the anode chamber are withdrawn as a gaseous mixture of air and entrained in a caustic solution. Entrainment is accomplished by recirculating the caustic solution through an aspirator which exerts a slight negative pressure on the anode chamber. The reagents produced by the electrolytic process in the anode chamber are predominantly chlorooxy acids in aqueous solutions. Hence their vapor phase constituents, which are swept from the anode chamber, are neutralized by contact with the caustic solution at the aspirator and become stabilized as dissolved salts.

While neutralization and stabilization greatly reduce the oxidizing potential of many of the oxidizing species generated in the anode chamber, it enhances the activity of others. A number of experiments were undertaken to identify the active species. The experimental evidence suggests that the major active ingredients are sodium salts of $ClO_x$. While $x=1$ predominates, others values of x up to six and seven are possible. Other active ingredients appears to be salts of the Oxion. These latter compounds are not nearly as stable in caustic solutions as are the $ClO_x$ salts, and they certainly are more difficult to monitor on an analytical basis. In both cases, however, the salt complexes can be destabilized by acid conditions (pH reduction) and ultraviolet light.

There is one final indication that $ClO_x$ salts are the major ingredient of the liquid reagent. This indicator was drawn from the observation that the ash content of treated cotton gin wastes increased over and above that of the untreated materials. The increase went beyond what might be expected from the addition of the NaOH (0.4%) to the base reagent. Only the presence of the stable, salt forming chloride ion accounts for this increasing level of ash. The $O_x$ salts are not stable enough to withstand the thermal effects of the ashing process. Hence the preponderance of the experimental evidence suggests that for the liquid reagent generated for use in the feed trials, the active ingredients are sodium salts of $ClO_x$.

DETERMINATION OF OXIDANT CONCENTRATION

In carrying out these analyses, the solutions have been characterized by normality of the oxidizer species rather than concentration in parts per million (p.p.m.). An oxidant is a chemical species that accepts electrons from another chemical species, the reductant. Oxidant strength is a measure of affinity to accept electrons and does not depend on concentration. Concentration measures the number of oxidant molecular or ions per liter of solution, regardless of oxidant strength. For example, the oxidizing strength of ozone Is higher than that of chlorine, even if the chlorine concentration in a solution is larger than the ozone concentration.

Chemists commonly use the normality concentration scale for oxidants and reductants. For an oxidant, normality is defined as the number of oxidizing equivalents present in exactly one liter of solution. One equivalent equals the amount of oxidant that accepts precisely one mole ($6.022 \times 10^{23}$) of electrons. The symbol representing the normality concentration scale is N.

It is not necessary to know the composition of a mixed oxidant to calculate Its normality. The normality scale may be used to express the total oxidizing capacity per liter of a mixed oxidant solution, regardless of how many oxidants are present or what their separate concentrations are.

For oxidants, parts per million is defined as follows: ppm=(mass of oxidant$\times$1,000,000)/(mass of solution) If the ppm scale is to be used exactly, the chemical formula of the oxidant, the mass of the oxidant and the mass of the solution must all be known. In practice, it is not convenient to directly measure the masses of oxidant and solution, Furthermore, the ppm scale is confusing if the chemical formula of the oxidant is not known or if a mixture of oxidants is present.

The use of normality has the advantage that it may be determined by titration without weighing anything, and directly measures the most important property of a commercial oxidant solution, its capacity to accept electrons per unit volume. When scales such as ppm of $Cl^2$ or ppm of $O^3$ are used, confusion may arise when the actual oxidants in solution are not $Cl^2$ or $O^3$ respectively Normality is determined by titration using the formula: $N_{standard} \times V_{standard} = N_{sample} \times V_{sample}$ is used. An exact volume ($V_{sample}$) of sample oxidant solution (i.e., 10 ml) is measured by piper and transferred into a flask. The sample is then titrated by a standardized reductant (i.e. sodium thiosulfate for iodine titrations) whose normality ($N_{standard}$) is known exactly. When the oxidant is used up at the titration endpoint, the volume of standardized reductant consumed ($V_{standard}$) is recorded from the buret reading. The normality of the sample ($N_{sample}$) is easily calculated after $N_{standard}$, $V_{standard}$ and $V_{sample}$ are all determined: $N_{sample} = (N_{standard} \times V_{standard})/V_{sample}$. Standardized reductant solutions may be purchased or made up in the laboratory according to well-established procedures.

The reactions of chlorine and ozone with electrons may be represented:

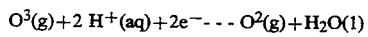

Since both $Cl_2$ and $O_3$ accept 2 electrons, equivalent weights equal one-half of the molecular weights, For $Cl^2$, the mass that accepts one mole of electrons equals 70.906 g per mole/2 equivalents per mole=35.453 g per equivalent. Similarly, the equivalent weight of $O^3$ is 48.00/2=24.00 g per equivalent Approximate conversions between ppm and normality scales are:

ppm $Cl^2$ = Normality $\times$ 35,453 ppm $O^3$ = Normality $\times$ 24,000

These approximate conversions assume that the mass of 1 liter of solution equals 1 kg=1,000 g (reasonable for dilute aqueous solutions). Oxidant concentrations on the ppm of $Cl^2$ or ppm of $O^3$ scales can be converted to normality using the same formulae, i.e., Normality =ppm $Cl^2$/35,453 and Normality=ppm $O^3$/24,000.

A water cooled 500 amp system was evaluated with 2 different anode configurations (FIGS. 4–9, and FIGS. 4, 10, 11). Results were favorable and offer a direct path to "scale-up" capability in high amperage cells.

EXAMPLE 1

The cell shown in FIGS. 4–9 was operated at 6 v. 250 amp with a NaCl solution and a mixed oxidant gas was evolved. The mixed oxidant gas was absorbed in an alkaline aqueous solution prepared by mixing 280 ml of 50% aqueous NaOH with 60 gal of water.

Water samples were taken and analyzed by acidified KI crystals and sodium thiosulfate reductant. The formula $N_{std} \times V_{std} = N_{sample} \times V_{sample}$ is then applied to determine normality of the sample. Titrations were made at different pH levels before acidification to give Cl content and after acidification to give $O^3$. The results of titrations at selected pH levels are set forth in Table I below.

TABLE I

| pH level | 9.6 | 7.5 | 6.9 |
|---|---|---|---|
| Normality of Cl | .0056 | .0072 | .0102 |
| Normality of $O^3$ | .0074 | .0080 | .0088 |
| ppm total oxidant | 376 | 447 | 561 |

EXAMPLE 2

The cell shown in FIGS. 4–9 was operated at 8.5 v. 400 amp with a NaCl solution and a mixed oxidant gas was evolved. The mixed oxidant gas was absorbed in an alkaline aqueous solution prepared by mixing 280 ml of 50% aqueous NaOH with 60 gal of water.

Water samples were taken and analyzed by acidified KI crystals and sodium thiosulfate reductant. The formula $N_{std} \times V_{std} = N_{sample} \times V_{sample}$ is then applied to determine normality of the sample. Titrations were made at different pH levels before acidification to give Cl content and after acidification to give $O^3$. The results of titrations at selected pH levels are set forth in Table II below.

TABLE II

| pH level | 9.7 | 8.5 | 7.1 |
|---|---|---|---|
| Normality of Cl | .0060 | .0070 | .0094 |
| Normality of $O^3$ | .0050 | .0100 | .0110 |
| ppm total oxidant | 333 | 488 | 597 |

EXAMPLE 3

The cell shown in FIGS. 4, 10, 11 was operated at 6 v. 400 amp with a NaCl solution and a mixed oxidant gas was evolved. The mixed oxidant gas was absorbed in an alkaline aqueous solution prepared by mixing 280 ml of 50% aqueous NaOH with 60 gal of water.

Water samples were taken and analyzed by acidified KI crystals and sodium thiosulfate reductant. The formula $N_{std} \times V_{std} = N_{sample} \times V_{sample}$ is then applied to determine normality of the sample. Titrations were made at different pH levels before acidification to give Cl content and after acidification to give $O^3$. The results of titrations at selected pH levels are set forth in Table III below.

TABLE III

| pH level | 10.6 | 9.1 | 7.3 |
|---|---|---|---|
| Normality of Cl | .0050 | .0062 | .0094 |
| Normality of $O^3$ | .0020 | .0058 | .0070 |
| ppm total oxidant | 225 | 359 | 501 |

Conclusions From Titrations

The analyses utilizing 2 end point titrations (one prior to acidification of sample and another after acidification) may prove valuable when correlated with extreme pH variations which may effect either component. To apply the solution at a pH of 7.5-8.3 is an advantage as a non-acidic and non-caustic solution. Users are always concerned over equipment corrosion.

High pH ranges favor Cl2 groups, lower pH ranges favor peroxido ("O") groups). pH sensitive for adjustment of mixed oxidant components is the secret to the mixed oxidant makeup. NaOH is needed if only to buffer the water tank to allow mixed oxidant to build up to the desired (and required) normality level. Attempting to utilize distilled water for test purposes was not useful for the above reason.

Treatment of Cellulosic Wastes

A number of experiments were carried out for treating various cellulosic wastes with mixed oxide, i.e., $NaClO_x$, solutions produced as described above. The treated waste was first tested for improved digestibility of the cellulosic wastes. It was then used to demonstrate the actual use of the treated product in feeding animals. The tests were run principally on cotton gin trash (CGT) to make it digestible and on other feedstocks to improve digestibility.

EXAMPLE 4

Mixed Oxidant Solution Treatment Cotton Gin Trash

A mixed oxidant gas generator, as shown in FIG. 2, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.070% mixed oxidants (700 ppm.) in the form of $NaClO_x$ salts, where x=1-7. 200 ml. mixed oxidant solution were mixed with 120 ml. of 50% aqueous NaOH. Sufficient solution was sprayed on dry chopped gin trash (cotton bolls, stems, etc.) to produce a pH of 11.9 (which is lowered rapidly as lignin is released) and a water content of 35% in the gin trash and mixed for one minute.

After allowing the chopped gin trash to set a short time to react, the product was evaluated by subjecting it to contact with the stomach digestive juices of the ruminant and the amount digested determined by weight loss. The product obtained had a digestibility of about 54%. The digestibility of an untreated control is about 36%. The high alkalinity of the treating solution, however, is a disadvantage in that it contributes to excessive corrosion in the processing equipment.

EXAMPLE 5—MIXED OXIDANT SOLUTION TREATMENT COTTON GIN TRASH

A mixed oxidant gas generator, as shown in FIGS. 4-9, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.5 having a mixed oxidant normality (total normality of Cl and $O^3$) of 0.0365. The solution was sprayed on dry chopped gin trash (cotton bolls, stems, etc.) at a rate of 30 gal. per ton.

After allowing the chopped gin trash to set a short time to react, the product was evaluated by subjecting it to contact with the stomach digestive juices of the ruminant and the amount digested determined by weight loss. The product obtained had a digestibility of about 56%. The digestibility of an untreated control is about 36%. The nearly neutral treating solution is advantageous, in addition to producing a highly digestible product, in that it reduces corrosion in the processing equipment.

EXAMPLE 6

Mixed Oxidant Solution Treatment Cotton Gin Trash

A mixed oxidant gas generator, as shown in FIGS. 4, 10 and 11, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.5 having a mixed oxidant normality (total normality of Cl and $O^3$) of 0.0365. The solution was sprayed on dry chopped gin trash (cotton bolls, stems, etc. ) at a rate of 30 gal. per ton.

After allowing the chopped gin trash to set a short time to react, the product was evaluated by subjecting it to contact with the stomach digestive juices of the ruminant and the amount digested determined by weight loss. The product obtained had a digestibility of about 56%. The digestibility of an untreated control is about 36%. The nearly neutral treating solution is advantageous, in addition to producing a highly digestible product, in that it reduces corrosion in the processing equipment.

EXAMPLE 7

Mixed Oxidant Solution Treatment Chopped Newsprint

A mixed oxidant gas generator, as shown in FIGS. 4-9, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.5 having a mixed oxidant normality (total normality of Cl and $O^3$) of 0.0365. The solution was sprayed on dry chopped newsprint at a rate of 30 gal. per ton.

After allowing the chopped newsprint to set a short time to react, the product was evaluated by subjecting it to contact with the stomach digestive juices of the ruminant and the amount digested determined by weight loss. The product obtained had a digestibility of about 46%. The digestibility of an untreated control is about 25%. The nearly neutral treating solution is advantageous, in addition to producing a moderately digestible product, in that it reduces corrosion in the processing equipment.

EXAMPLE 8

Mixed Oxidant Solution Treatment Chopped Straw

A mixed oxidant gas generator, as shown in FIGS. 4–9, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.5 having a mixed oxidant normality (total normality of Cl and $O^3$) of 0.0365. The solution was sprayed on dry chopped wheat straw at a rate of 30 gal. per ton.

After allowing the chopped straw to set a short time to react, the product was evaluated by subjecting it to contact with the stomach digestive juices of the ruminant and the amount digested determined by weight loss. The product obtained had a digestibility of about 55%. The digestibility of an untreated control is about 41%. The nearly neutral treating solution is advantageous, in addition to producing a product of improved digestibility, in that it reduces corrosion in the processing equipment.

EXAMPLE 9

Mixed Oxidant Solution Treatment Alfalfa Hay

A mixed oxidant gas generator, as shown in FIGS. 4–9, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.5 having a mixed oxidant normality (total normality of Cl and $O^3$) of 0.0365. The solution was sprayed on alfalfa hay at a rate of 30 gal. per ton.

After allowing the alfalfa hay to set a short time to react, the product was evaluated by subjecting it to contact with the stomach digestive juices of the ruminant and the amount digested determined by weight loss. The product obtained had a digestibility of about 63%. The digestibility of an untreated control is about 58% The nearly neutral treating solution is advantageous, in addition to producing a product of improved digestibility, in that it reduces corrosion in the processing equipment.

EXAMPLE 10

Mixed Oxidant Solution Treatment Bermuda Grass Silage

A mixed oxidant gas generator, as shown in FIGS. 4–9, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.5 having a mixed oxidant normality (total normality of Cl and $O^3$) of 0.0365. The solution was sprayed on Bermuda grass silage at a rate of 30 gal. per ton.

After allowing the silage to set a short time to react, the product was evaluated by subjecting it to contact with the stomach digestive Juices of the ruminant and the amount digested determined by weight loss. The product obtained had a digestibility of about 66%. The digestibility of an untreated control is about 57%. The nearly neutral treating solution is advantageous, in addition to producing a product of improved digestibility, in that it reduces corrosion in the processing equipment.

EXAMPLE 11

Mixed Oxidant Solution Treatment Whole Grain Treatment

A number of experiments were carried out to evaluate the possible improvement in digestibility of whole grains by treatment with the mixed oxides solutions to convert the indigestible cellulosic portions of the grains.

A mixed oxidant gas generator, as shown in FIGS. 4–9, was operated to produce a mixed-oxidant gas comprising a mixture of chlorine, chlorine oxides, hypochlorous acid and various oxygen species, such as oxygen, hydrogen peroxide, ozone, etc. The mixed oxidant gas was absorbed into aqueous alkali at pH 11.5 to produce a solution of pH 7.7 having a mixed oxidant normality (total normality of Cl and $O^3$) of 0.0365.

Whole kernel corn and whole kernel grain sorghum were run through a commercial scarifier to make small cuts in the surface of the grains and treated with water until 7% water was absorbed as controls. Whole kernel corn and whole kernel grain sorghum were treated with the above described solution to an uptake of 7% by weight. Grains may be frozen (for storage purposes only) after treatment.

Corn, with 7% MO solution absorption, had an increase in digestibility of 38% over untreated controls after 12 hours treatment. Grain sorghum, with 7% MO solution absorption, had an improvement in digestibility of 56% over untreated controls after 16 hours treatment.

The improvement in whole grains is attributable to the conversion of the cellulosic shell of the grain which is relatively indigestible. To the extent that the cellulosic shell of the grain is relatively indigestible, it can be considered a cellulosic waste for the purposes of this invention, subject to improvement in digestibility by the treatment of this invention.

Conclusions from the tests which were run are that mixed oxidant solutions produced from the cells of FIGS. 4–9, and FIGS. 4, 10 and 11 are most useful at a pH of about 7.5–8.3 and total oxidant normality of 0.0100–0.0400. For commercial applications, the mixed oxidant gases from the cells of FIGS. 4–11 are absorbed in aqueous alkali at pH 11.5–12.5 and normality of total oxidant species of 0.09–0.4 as a concentrate suitable for shipment. The concentrate is then diluted with water about 10:1 to yield a treating solution having a pH of 7.5–8.3 and a total oxidant normality of 0.01–0.04.

While this invention has been described fully and completely, with special emphasis on several preferred embodiments, it should be understood that, within the scope of the appended claims, the invention may be practiced otherwise than as specifically described.

I claim:

1. A method for treating cellulosic wastes to render them edible by ruminants, which comprises
providing a mixed oxidant gas generator comprising a hollow container having a wall dividing the same into two compartments and including an ion-permeable membrane permitting flow of cations therethrough,
a steel plate cathode in one of said compartments,
a titanium anode assembly in the other of said compartments comprising at least one titanium plate anode and at least two titanium bipolar elements supported on said anode in closely spaced insulated relation thereto,
providing water to said cathode compartment,
providing a water solution of a chloride salt to said anode compartment,
passing a direct current through said water and said chloride salt solution to produce a mixed oxidant gas in said anode compartment comprising a plurality of oxygen and chlorine containing oxidizing species and to produce hydrogen and sodium hydroxide in said cathode compartment,
collecting said mixed oxidant gas in aqueous alkali solution,
adjusting the pH of said solution to about 7.5–8.3 and the normality of oxidant species in solution to 0.01–0.04,
providing a quantity of cellulosic wastes, and
treating said cellulosic wastes with said mixed oxidant solution to convert said wastes into a form edible by ruminants.

2. A method according to claim 1 in which
said titanium anode assembly comprises at least one titanium plate anode and at least two titanium bipolar elements supported in closely spaced insulated co-planar relation thereto.

3. A method according to claim 2 in which
said at least one titanium plate anode and at least two titanium bipolar elements are supported on a bus rod in coplanar relation,
said titanium bi-polar elements elements are supported on and insulated from said bus rod and said titanium plate anode.

4. A method according to claim 1 in which
said titanium anode assembly comprises at least one titanium plate anode and at least two titanium mesh bipolar elements supported on opposite sides of said anode in closely spaced insulated relation thereto.

5. A method according to claim 1 in which
said ion-permeable membrane comprises only part of said wall of said oxidant gas generator.

6. A method according to claim 1 in which
said oxidant gas generator ion-permeable membrane comprises a perflourosulfonic polymer.

7. A method according to claim 1 in which
said oxidant gas generator ion-permeable membrane comprises a woven membrane of KANECARON fibers, a modacrylic composition of acrylic polymeric structure having 35–85% wt. acrylonitrile units.

8. A method according to claim 1 in which
said oxidant gas generator ion-permeable membrane comprises a woven membrane of KANECARON fibers, a modacrylic composition of acrylic polymeric structure having 50% acrylonitrile and 50% vinyl chloride fibers.

9. A method according to claim 1 in which
said oxidant gas generator container includes openings for introduction of water and a chloride salt and openings for removal of sodium hydroxide and of hydrogen and oxidant gases.

10. A method according to claim 1 in which
said cellulosic wastes comprise straw, corn husks, cotton gin trash, peanut shells, saw dust or feed grains.

11. A method according to claim 1 in which
said cellulosic wastes are comminuted before treatment with said mixed oxidant solution.

12. A method according to claim 1 in which
said treated wastes, after completion of reaction, contain cellulose and sugars in a form digestible by ruminants.

13. A method according to claim 1 in which
said mixed oxidant gases are absorbed in aqueous alkali at pH 11.5–12.5 and normality of total oxidant species of 0.09–0.4 as a concentrate suitable for shipment,
the pH drops quickly to about 8.5–9.0, and
said concentrate is subsequently diluted with sufficient water to yield a treating solution having a pH of 7.5–8.3 and a total oxidant normality of 0.01–0.04.

14. A method according to claim 1 in which
said titanium anode assembly comprises at least one titanium plate anode and at least two titanium bipolar elements supported in closely spaced insulated co-planar relation thereto,
said ion-permeable membrane comprises only part of said wall of said oxidant gas generator,
said oxidant gas generator ion-permeable membrane comprises a perflourosulfonic polymer or a woven membrane of KANECARON fibers, a modacrylic composition of acrylic polymeric structure having 35–85% wt. acrylonitrile units,
said oxidant gas generator container includes openings for introduction of water and a chloride salt and openings for removal of sodium hydroxide and of hydrogen and oxidant gases,
said mixed oxidant gases are absorbed in aqueous alkali at pH 11.5–12.5 and normality of total oxidant species of 0.09–0.4 as a concentrate suitable for shipment,
the pH drops quickly to about 8.5–9.0, and
said concentrate is subsequently diluted with sufficient water to yield a treating solution having a pH of 7.5–8.3 and a total oxidant normality of 0.01–0.04.

15. A method according to claim 1 in which
said titanium anode assembly comprises at least one titanium plate anode and at least two titanium mesh bipolar elements supported on opposite sides of said anode in closely spaced insulated relation thereto,
said ion-permeable membrane comprises only part of said wall of said oxidant gas generator,
said oxidant gas generator ion-permeable membrane comprises a perflourosulfonic polymer or a woven membrane of KANECARON fibers, a modacrylic composition of acrylic polymeric structure having 35–85% wt. acrylonitrile units,
said oxidant gas generator container includes openings for introduction of water and a chloride salt and openings for removal of sodium hydroxide and of hydrogen and oxidant gases, said mixed oxidant gases are absorbed in aqueous alkali at pH 11.5–12.5 and normality of total oxidant species of 0.09–0.4 as a concentrate suitable for shipment, the pH drops quickly to about 8.5–9.0, and said concentrate is subsequently diluted with sufficient water to yield a treating solution having a pH of 7.5–8.3 and a total oxidant normality of 0.01–0.04.

16. An edible food for ruminants produced according to the method of claim 1.

* * * * *